US009674406B2

(12) United States Patent
Kutz et al.

(10) Patent No.: US 9,674,406 B2
(45) Date of Patent: Jun. 6, 2017

(54) USING DYNAMIC MODE DECOMPOSITION FOR REAL-TIME BACKGROUND/FOREGROUND SEPARATION IN VIDEO

(71) Applicant: University of Washington, Seattle, WA (US)

(72) Inventors: Jose Nathan Kutz, Seattle, WA (US); Jacob Grosek, Seattle, WA (US); Steven Brunton, Seattle, WA (US); Xing Fu, Seattle, WA (US); Seth Pendergrass, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 28 days.

(21) Appl. No.: 14/828,396

(22) Filed: Aug. 17, 2015

(65) Prior Publication Data

US 2016/0050343 A1 Feb. 18, 2016

Related U.S. Application Data

(60) Provisional application No. 62/037,984, filed on Aug. 15, 2014.

(51) Int. Cl.
*H04N 5/262* (2006.01)
*H04N 5/222* (2006.01)
*H04N 5/14* (2006.01)

(52) U.S. Cl.
CPC .......... *H04N 5/2226* (2013.01); *H04N 5/144* (2013.01)

(58) Field of Classification Search
None
See application file for complete search history.

(56) References Cited

U.S. PATENT DOCUMENTS 8,009,918 B2   8/2011   Van Droogenbroeck et al.
2006/0029253 A1   2/2006   Pace

OTHER PUBLICATIONS

Benezeth, Y., et al., "Comparative Study of Background Subtraction Algorithms," Journal of Electronic Imaging 19(3):033003-1-033003-12, Jul.-Sep. 2010.
Candès, E., and B. Recht, "Exact Matrix Completion via Convex Optimization," Foundations of Computational Mathematics 9(6):717-772, Dec. 2009.
Candès, E., et al., "Robust Principal Component Analysis?" Computing Research Repository, Stanford University, Dec. 2009, <http://statweb.stanford.edu/~candes/papers/RobustPCA.pdf> [retrieved Sep. 16, 2016], 13 pages.

(Continued)

*Primary Examiner* — Roberto Velez
*Assistant Examiner* — Stephen Coleman
(74) *Attorney, Agent, or Firm* — Christensen O'Connor Johnson Kindness PLLC

(57) ABSTRACT

The technique of dynamic mode decomposition (DMD) is disclosed herein for the purpose of robustly separating video frames into background (low-rank) and foreground (sparse) components in real-time. Foreground/background separation is achieved at the computational cost of just one singular value decomposition (SVD) and one linear equation solve, thus producing results orders of magnitude faster than robust principal component analysis (RPCA). Additional techniques, including techniques for analyzing the video for multi-resolution time-scale components, and techniques for reusing computations to allow processing of streaming video in real time, are also described herein.

18 Claims, 10 Drawing Sheets

(56) References Cited

OTHER PUBLICATIONS

Candès, E., et al., "Robust Uncertainty Principles: Exact Signal Reconstruction From Highly Incomplete Frequency Information," IEEE Transactions on Information Theory 52(2):489-509, Feb. 2006.

Chen, K.K., et al., "Variants of Dynamic Mode Decomposition: Boundary Condition, Koopman, and Fourier Analyses," Journal of Nonlinear Science 22(6):887-915, Dec. 2012.

"Dataset: i-Lids Bag and Vehicle Detection Challenge," IEEE International Conference on Advanced Video and Signal Based Surveillance (AVSS 2007), London, Sep. 5-7, 2007; Queen Mary University of London, School of Electronic Engineering and Computer Science, <https://web.archive.org/web/20100731162901/http://www.eecs.qmul.ac.uk/~andrea/avss2007_d.html> [retrieved Jul. 15, 2016], 3 pages.

De La Torre, F., and M. Black, "A Framework for Robust Subspace Learning," International Journal of Computer Vision 54(1-3):117-142, Aug. 2003.

Fischler, M.A., and R.C. Bolles, "Random Sample Consensus: A Paradigm for Model Filling With Applications to Image Analysis and Automated Cartography," Communications of the ACM 24(6):381-395, Jun. 1981.

Ganesh, A., et al., "Fast Algorithms for Recovering a Corrupted Low-Rank Matrix," Proceedings of the 3rd International Workshop on Computational Advances in Multi-Sensor Adaptive Processing (CAMSAP), Dec. 2009, pp. 213-216.

Gnanadesikan, R., and J.R.. Kettenring, "Robust Estimates, Residuals, and Outlier Detection With Multiresponse Data," Biometrics 28(1):81-124, Mar. 1972.

Grosek, J., and J.N. Kutz, "Dynamic Mode Decomposition for Real-Time Background/Foreground Separation in Video," Computer Science: Computer Vision and Pattern Recognition (cs.CV), arXiv:1404.7592v1[cs.CV], Apr. 2014, <http://arXiv.org/pdf/1404.7592> [retrieved Sep. 16, 2016], 14 pages.

He, J., et al., "Incremental Gradient on the Grassmannian for Online Foreground and Background Separation in Subsampled Video," Proceedings of the IEEE Conference on Computer Vision and Pattern Recognition (CVPR), Providence, R.I., Jun. 16-21, 2012, pp. 1568-1575.

Ke, Q., and T. Kanade, "Robust $L_1$ Norm Factorization in the Presence of Outliers and Missing Data by Alternative Convex Programming," Proceedings of the IEEE Computer Society Conference on Computer Vision and Pattern Recognition (CVPR '05), Jun. 20-25, 2005, San Diego, pp. 739-746.

Kutz, J.N., "Data-Driven Modeling & Scientific Computing: Methods for Integrating Dynamics of Complex Systems & Big Data," Oxford University Press, Sep. 2013, pp. 403-411, 506-520.

Li, L., et al., "Statistical Modeling of Complex Backgrounds for Foreground Object Detection," IEEE Transactions on Image Processing 13(11):1459-1472, Nov. 2004.

Lin, Z., et al., "The Augmented Lagrange Multiplier Method for Exact Recovery of Corrupted Low-Rank Matrices," Jniversity of Illinois at Urbana-Champaign Technical Report, Optimization and Control, rXiv:1009.5055v2 [Math OC], Mar. 2011, <http://arXiv.org/abs/1009.5055?context=math> [retrieved Sep. 16, 2016], 23 pages.

Little, S., et al., "An Information Retrieval Approach to Identifying Infrequent Events in Surveillance Video," Proceedings of the 3rd ACM Conference on International Conference on Multimedia Retrieval, Dallas, Apr. 16-20, 2013, pp. 223-230.

Maddalena, L, and A. Petrosino, "A Self-Organizing Approach to Background Subtraction for Visual Surveillance Applications," IEEE Transactions on Image Processing 17(7):1168-1177, Jul. 2008.

Nastase, I., et al., "Image Processing Analysis of Vortex Dynamics of Lobed Jets From Three-Dimensional Diffusers," Fluid Dynamics Research 3(46):065502, 19 pages, Nov. 2011.

Rowley, C.W., et al., "Spectral Analysis of Nonlinear Flows," Journal of Fluid Mechanics 641:115-127, Dec. 2009.

Schmid, P.J., "Dynamic Mode Decomposition of Numerical and Experimental Data," Journal of Fluid Mechanics 656:5-28, Aug. 2010.

Schmid, P.J., et al., "Applications of the Dynamic Mode Decomposition," Theoretical and Computational Fluid Dynamics 25(1-4):249-259, Jun. 2011.

Siebel, N.T., and S. Maybank, "Fusion of Multiple Tracking Algorithms for Robust People Tracking," Proceedings of the 7th European Conference on Computer Vision (ECCV 2002), Part IV, Copenhagen, May 28-31, 2002, pp. 373-387.

Tian, Y.-L., et al., "Robust and Efficient Foreground Analysis for Real-Time Video Surveillance," Proceedings of the IEEE Computer Society Conference on Computer Vision and Pattern Recognition (CVPR '05), San Diego, Jun. 20-25, 2005, pp. 1182-1187.

Trefethen, L.N., and D. Bau, III, "Numerical Linear Algebra," SIAM (Society for Industrial and Applied Mathematics], Philadelphia, 1997, "Lecture 33. The Arnoldi Iteration," pp. 250-275.

Tu, J.H., et al., "On Dynamic Mode Composition: Theory and Applications," Journal of Computational Dynamics 1(2):391-421, Dec. 2014.

University of Illinois at Urbana-Champaign—Perception and Decision Lab, and Microsoft Research Asia, Beijing, © 2009, 2013, "Low-Rank Matrix Recovery and Completion via Convex Optimization: Sample Code," <https://web.archive.org/web/20131124131718/http://perception.csl.illinois.edu/matrix-rank/sample_code.html> [retrieved Jul. 2016], 4 pages.

Yang, F., et al., "Adaptive Low Rank and Sparse Decomposition of Video Using Compressive Sensing," Proceedings of the 20th IEEE International Conference on Image Processing (ICIP 2013), Melbourne, Sep. 15-18, 2013, pp. 1016-1020.

| CPU | MEMORY TRANSFERS | GPU |
|---|---|---|
| | WRITE X TO GPU | |
| | | CALCULATE $(X_1^{m-1})^T X_1^{m-1}$ |
| | READ $(X_1^{m-1})^T X_1^{m-1}$ FROM GPU | |
| CALCULATE EIGENVALUES/ EIGENVECTORS S AND V OF $(X_1^{m-1})^T X_1^{m-1}$ | | CALCULATE $(X_1^{m-1})^T X_2^m$ |
| | WRITE S, V TO GPU | |
| | | CALCULATE $U^T X_2^m$ |
| | | CALCULATE Ã |
| | READ Ã FROM GPU | |
| CALCULATE EIGENVALUES/ EIGENVECTORS D AND W OF Ã | | |
| | WRITE D, W TO GPU | |
| | | CALCULATE $V\Sigma^{-1}W$ |
| | READ $V\Sigma^{-1}W$ FROM GPU | CALCULATE Φ |
| | READ Φ FROM GPU | CALCULATE L, S |
| | READ L, S FROM GPU | |

*FIG. 5*

$$(X_1^m)^* X_1^m = \begin{bmatrix} \langle x_1, x_1\rangle & \langle x_1, x_2\rangle & \cdots & \langle x_1, x_m\rangle \\ \langle x_2, x_1\rangle & \langle x_2, x_2\rangle & \cdots & \langle x_2, x_m\rangle \\ \vdots & \vdots & \ddots & \vdots \\ \langle x_m, x_1\rangle & \langle x_m, x_2\rangle & \cdots & \langle x_m, x_m\rangle \end{bmatrix}$$

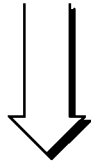

$$(X_2^{m+1})^* X_2^{m+1} = \begin{bmatrix} \langle x_2, x_2\rangle & \cdots & \langle x_2, x_m\rangle & \langle x_2, x_{m+1}\rangle \\ \vdots & \ddots & \vdots & \vdots \\ \langle x_m, x_2\rangle & \cdots & \langle x_m, x_m\rangle & \langle x_m, x_{m+1}\rangle \\ \langle x_{m+1}, x_2\rangle & \cdots & \langle x_{m+1}, x_m\rangle & \langle x_{m+1}, x_{m+1}\rangle \end{bmatrix}$$

*FIG. 7*

USING DYNAMIC MODE DECOMPOSITION FOR REAL-TIME BACKGROUND/FOREGROUND SEPARATION IN VIDEO

CROSS-REFERENCE TO RELATED APPLICATION

This application claims the benefit of Provisional Application No. 62/037,984, filed Aug. 15, 2014, the entire disclosure of which is hereby incorporated by reference for all purposes.

STATEMENT OF GOVERNMENT LICENSE RIGHTS

This invention was made with Government support under Grant No. DE-EE0006785, awarded by the Department of Energy (DOE); Grant No. FA9550-09-0174, awarded by the Air Force Office of Scientific Research (AFOSR); and Grant No. DMS-100762, awarded by the National Science Foundation (NSF). The Government has certain rights in the invention.

BACKGROUND

The demand for accurate and real-time video manipulation and processing techniques is of growing importance. In particular, algorithms that can separate background variations in a video stream, which are highly correlated between frames, from foreground objects in the video stream of potential interest are at the forefront of modern data-analysis research. Background/foreground separation can be an integral step in detecting, identifying, tracking, and recognizing objects in video sequences. Many modern computer vision applications demand processing that can be implemented in real-time, and that are robust enough to handle diverse, complicated, and cluttered backgrounds. Effective methods often need to be flexible enough to accommodate changes in a scene due to, for instance, illumination changes that can occur throughout the day, or location changes where the application is being implemented. Accordingly, what is needed are techniques that can separate foreground and background elements from video data that are efficient enough to provide processing results in real-time on consumer-grade computing hardware, and that are flexible enough to operate on changing and/or complex backgrounds.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer implemented method of separating foreground information and background information in video data is provided. A video sensor generates video data that includes a set of video frames. A first window within the video data is determined, wherein the first window indicates a portion to be analyzed of the video data. Foreground information and background information within the first window of video data is detected by: calculating, by a computing device, a singular value decomposition (SVD) of data within the first window; generating a matrix $\tilde{A}$ using the results of the SVD, wherein $\tilde{A}$ represents a K×K projection of a matrix A onto proper orthogonal decomposition (POD) modes, and wherein the matrix A represents changes between video frames within the first window; performing an eigendecomposition of matrix $\tilde{A}$ to determine an eigenvector matrix W and a diagonal matrix of eigenvalues D; and using the eigenvectors W and eigenvalues D to generate indications of at least one of foreground information and background information in the first window. An output is generated based on at least one of the indication of foreground information and the indication of background information in the first window.

In some embodiments, a computer-implemented method of detecting motion in streaming video data is provided. A stream of video data is received. Motion is detected within a first window of the stream of video data, the first window including a sequential set of video frames. Motion is then detected within a subsequent window of the stream of video data, wherein the subsequent window overlaps at least a portion of the first window. Detecting motion within the subsequent window includes reusing results of computations performed during the detection of motion within the first window.

In some embodiments, a computing device for separating foreground information and background information in video data is provided. The device comprises a central processing unit (CPU), a main memory, a graphics processing unit (GPU) having a graphics memory and a plurality of processing cores, and a nontransitory computer-readable medium. The computer-readable medium has computer-executable instructions stored thereon that, in response to execution by one or more processors of the computing device, cause the computing device to separate foreground information and background information in video data by collecting an initial matrix X of video data, wherein the matrix X is of rank n×m, wherein m is a number of frames of data in the video data, and wherein n is an amount of data from each video frame; calculating a matrix $(X_1^{m-1})^T X_1^{m-1}$, wherein $X_1^{m-1}$ is a matrix representing the video data in frames 1 to m−1; calculating eigenvalues S and eigenvectors V of matrix $(X_1^{m-1})^T X_1^{m-1}$; calculating a matrix $(X_1^{m-1})^T X_2^m$, wherein $X_2^m$ is a matrix representing the video data in frames 2 to m; using S, V, and $(X_1^{m-1})^T X_2^m$ to calculate a matrix $\tilde{A}$; calculating eigenvalues D and eigenvectors W of matrix $\tilde{A}$; and using D and W to generate indications of at least one of foreground information and background information in the video data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a table that illustrates details of how computations of a method of finding foreground objects in video data may be accelerated by using both a central processing unit (CPU) and a graphical processing unit (GPU) in an exemplary embodiment of the present disclosure;

FIG. 7 illustrates matrices that exhibit an overlap of calculations between neighboring SVDs according to various aspects of the present disclosure.

DETAILED DESCRIPTION

Figure 1:
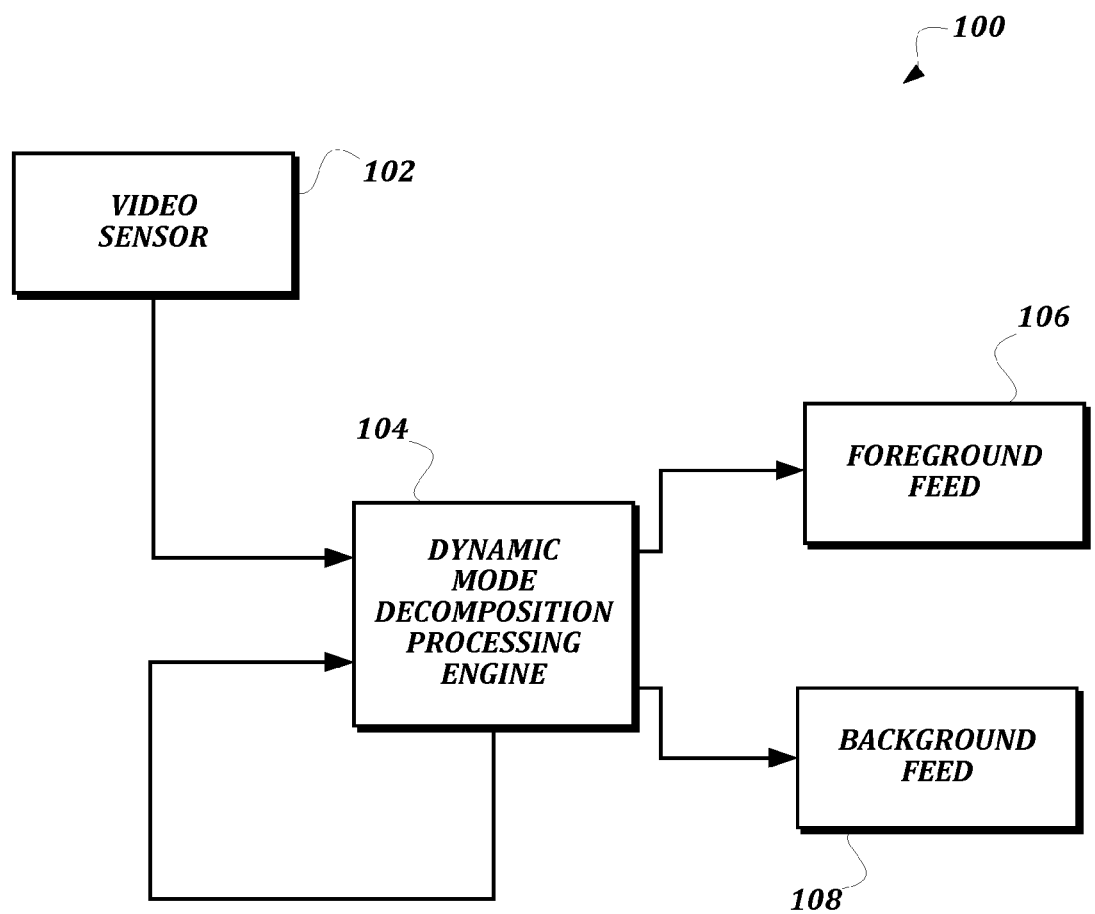
FIG. 1 is a schematic diagram that illustrates an exemplary embodiment of a system for separating foreground and background information in video data according to various aspects of the present disclosure.

One potential viewpoint of this computational task is to view it as a matrix separation problem into low-rank (background) and sparse (foreground) components. Recently, this viewpoint has been advocated by Candés et al. in the framework of robust principal component analysis (RPCA). By weighting a combination of the nuclear and the $L_1$ norms, a convenient convex optimization problem (principal component pursuit) was demonstrated, under suitable assumptions, to exactly recover the low-rank and sparse components of a given data-matrix (or video for our purposes). The RPCA technique, whose bulk of computational costs arises from the convex optimization procedure, was shown to be highly-competitive in comparison to the state-of-the-art computer vision procedure developed by De La Torre and Black. In this disclosure, we advocate the same matrix separation approach, but by using the method of dynamic mode decomposition (DMD) instead of RPCA. This method, which essentially implements a Fourier decomposition of the video frames in time, distinguishes the stationary background from the dynamic foreground by differentiating between the near-zero modes and the remaining modes bounded away from the origin, respectively.

Originally introduced in the fluid mechanics community, DMD has emerged as a powerful tool for analyzing the dynamics of nonlinear systems. In the context of fluids, DMD has gained popularity since it provides, in an equation-free manner, information about the dynamics of flow even if the underlying dynamics is nonlinear. It is equation-free in the sense that a typical application requires collecting a time series of experimental (or simulated) velocity fields, and from them computing DMD modes and eigenvalues. The modes are spatial fields that often identify coherent structures in the flow. The corresponding eigenvalues define growth/decay rates and oscillation frequencies for each mode. Taken together, the DMD modes and eigenvalues describe the dynamics observed in the time series in terms of oscillatory components; i.e. it is a decomposition of the data into Fourier modes in time.

In the application of video processing for detection of foreground and background information, the video frames are thought of as snapshots of an underlying complex/nonlinear dynamics. The DMD decomposition yields oscillatory time components of the video frames that have contextual implications. Namely, those modes that are near the origin represent dynamics that are unchanging, or changing slowly, and can be interpreted as stationary background pixels, or low-rank components of the data matrix. In contrast, those modes bounded away from the origin are changing on O(1) timescales or faster, and represent the foreground motion in the video, or the sparse components of the data matrix. Thus by simply applying the dynamical systems DMD interpretation to video frames, an effective RPCA technique can be enacted at a fixed cost of a singular-value decomposition and a linear equation solve, $O(N^3)$. Unlike the convex optimization procedure, which can be guaranteed to exactly produce a low-rank and sparse separation under certain assumptions, no such guarantees are currently given for the DMD procedure. Regardless, in comparison with the RPCA and computer vision methods, the DMD procedure is orders of magnitude faster in computational performance, resulting in real-time foreground/background separation of streaming video on laptop-class computing power.

More broadly, when considered in the generic context of RPCA, the DMD method considers a given data matrix X that we know to be composed from:

$$X=L+S$$

where L has a low-rank and S is sparse. At first, the ability to separate such a matrix X into its constitutive components seems to be an impossible task considering that the rank of L and the locations of the non-zero (sparse) components of S are unknown. Said another way, we desire to construct the 2N matrix elements of L and S given the N matrix elements of X. Candés was able to prove that an efficient and convenient convex optimization procedure could exactly recover the low-rank and sparse matrices under suitable circumstances, thus allowing for a highly-robust procedure for matrix separation and completion. Of course, this follows decades of work attempting to robustify the PCA dimensionality-reduction technique, through, for instance, influence function techniques, multivariate trimming, alternating minimization, and/or random sampling.

The DMD method, presented here, provides a seemingly robust and much more efficient technique for performing the function of RPCA and the ubiquitous computation found in the equation above. At its core, the DMD method relies on a underlying separation of time scales between the sparse and the low-rank structures in the data matrix. Much as in the RPCA technique, which is guaranteed to hold only under suitable conditions, the DMD method is also restricted to data matrices where clear slow-time and fast-time scales are present, i.e. the DMD eigenvalues can be separated into background and foreground modes by their distance from the origin. In the case of foreground/background detection for video surveillance, this is a natural consequence of the application: background portions of the video change on much slower time scales than foreground actions. Ultimately, timescale separation is also crucial for RPCA or any other background subtraction technique.

Dynamic mode decomposition (DMD) is a mathematical method that was developed in order to understand, control, or simulate inherently complex, nonlinear systems without necessarily knowing fully, or partially, the underlying governing equations that drive the system. Experimental (or simulated) data, collected in snapshots through time, can be processed with DMD in order to mimic, control, or analyze the current state and/or dimensionality of a system, or even to predict future states of, or coherent structures within, that system. The power of DMD is found in exploiting the intrinsic low-dimensionality of a complicated system, which may not be obvious a priori, and then rendering that system in a more computationally and theoretically tractable (low-dimensional) form. DMD has been traditionally used in the fluid mechanics, atmospheric science, and nonlinear waves communities as a popular method for data-based learning and discovery.

Given data that is collected in regularly spaced time intervals, the DMD method will approximate the low-dimensional modes of the linear, time-independent Koopman operator in order to estimate the potentially nonlinear dynamics of the system. This process is distinct from linearizing the dynamics. The dynamic information is resolved through a similar process as is found in the Arnoldi algorithm.

FIG. 1 is a schematic diagram that illustrates an exemplary embodiment of a system for separating foreground and background information in video data according to various aspects of the present disclosure. As illustrated, a video sensor 102 provides video data to a dynamic mode decomposition (DMD) processing engine 104. The video sensor 102 may be any type of device capable of producing video data and providing it to the DMD processing engine 104, such as an IP-based security camera; a webcam; a camera on a smartphone, tablet, or other mobile device; and/or the like.

In some embodiments, the video sensor 102 may provide a feed of live video data directly to the DMD processing engine 104 via a network; via a direct communication link such as USB, Bluetooth, HDMI, and/or the like; or via internal communication (if the video sensor 102 and DMD processing engine 104 are included in the same computing device). In some embodiments, video data generated by the video sensor 102 may be stored on a computer-readable medium, and the stored video data may be processed by the DMD processing engine 104 instead of a feed of live video data.

In some embodiments, the DMD processing engine 104 produces either a foreground feed 106, a background feed 108, or both. The foreground feed 106 is a version of the video data which includes only the moving objects within the video data. The background feed 108 is a version of the video data which includes only the stationary objects within the video data. Depending on the parameters chosen for processing by the DMD processing engine 104 as discussed further below, the background feed 108 may include portions of the video data that are moving, but at too slow of rate to be detected and included in the foreground feed 106. This allows the background of a video to change at a slow rate, such as through illumination changes throughout the course of a day, a slow pan of the camera, and/or the like, while still allowing motion faster than the slow rate to be included in the foreground feed 106. In some embodiments, the foreground feed 106 and/or the background feed 108 are provided as video feeds in a similar format to the video feed received from the video sensor 102. In some embodiments, the foreground feed 106 and/or the background feed 108 may be stored versions of the video data that include only the foreground information or only the background information, respectively.

In some embodiments, either the foreground feed or the background feed may include an alpha channel such that the video content other than the foreground or background may be replaced by other information. For example, the foreground feed 106 may include actual video data for the foreground information, and an alpha channel that indicates the background areas that are not part of the foreground information. This would allow the background to be replaced with any other desired video data, similar to a chromakey system or other video compositing technique.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Matlab, OpenCL, CUDA, and/or the like. An engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or application. In some embodiments, the term "engine" as used herein refers to a computing device that has one or more components that have been programmed or otherwise configured to perform the logic described as part of the engine.

Figure 2:
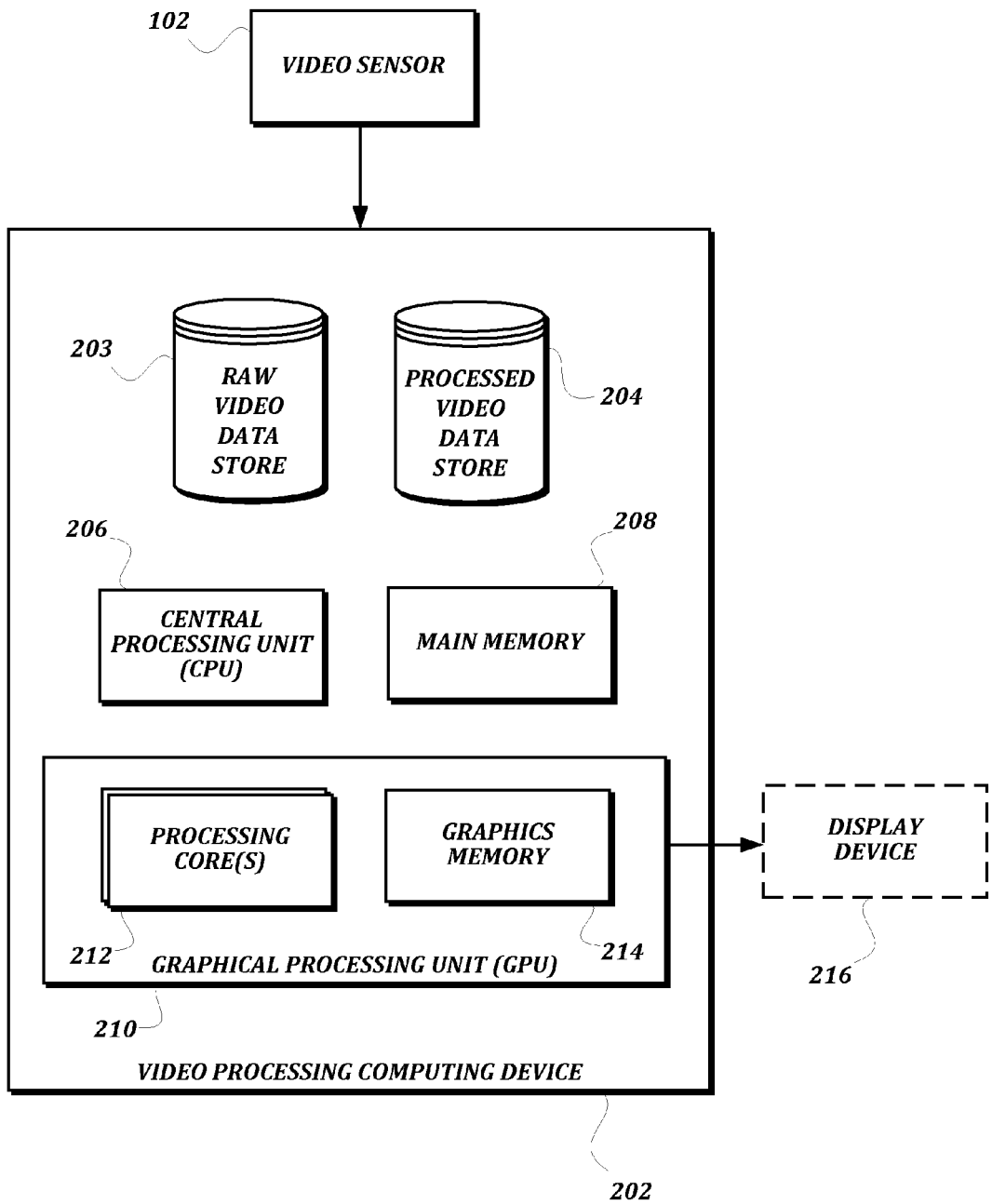
FIG. 2 is a block diagram of an exemplary embodiment of a video processing computing device suitable for implementing a dynamic mode decomposition processing engine according to various aspects of the present disclosure.

FIG. 2 is a block diagram of an exemplary embodiment of a video processing computing device suitable for implementing a dynamic mode decomposition processing engine according to various aspects of the present disclosure. As illustrated, the video processing computing device 202 includes a central processing unit (CPU) 206, a main memory 208, and a graphical processing unit (GPU) 210. As known to one of ordinary skill in the art, the CPU 206 is a processor that executes computer-executable instructions and manipulates data, and main memory 208 is a computer-readable medium directly accessible by the CPU 206 via a memory bus, and usually includes volatile memory such as random-access memory (RAM). As also known to one of ordinary skill in the art, the GPU 210 is a specialized device designed to efficiently manipulate computer graphics and image processing by having a highly parallel architecture. A typical GPU 210 includes a plurality of processing cores 212 and a graphics memory 214 that is local to the GPU 210 and therefore separate from the main memory 208. Information may be transferred from the main memory 208 and the graphics memory 214 for manipulation by the processing cores 212, and the results may be transferred from the graphics memory 214 back to the main memory 208. In some embodiments, the GPU 210 may also output processed video feeds (as discussed further below) to a display device 216 such as a monitor via any suitable video connection technology such as VGA, DisplayPort, HDMI, component video, and/or the like.

In some embodiments, the video processing computing device 202 also includes a raw video data store 203 and a processed video data store 204. The raw video data store 203 is configured to be used by the video processing computing device 202 to store video data received from the video sensor 102 before processing. The raw video data store 203 may be configured to continue to retain the video data after processing, in order to enable the recalculation of the processed information (or for any other reason). The processed video data store 204 is configured to store the final results and/or any intermediate results of the processing discussed herein. In some embodiments, one or both of the data stores may include storage on a non-volatile computer-readable medium coupled to the video processing computing device 202, such as a hard drive, a flash drive, and/or the like. In some embodiments, one or both of the data stores may include storage that is accessible by the video processing computing device 202 over a network, such as a cloud storage system, a network drive, a database accessible over the network, and/or the like. In some embodiments, the video processing computing device 202 may operate on live video data and produce output video feeds in a streaming manner, and so the raw video data store 203 and/or the processed video data store 204 may not be present or used.

Figure 3:
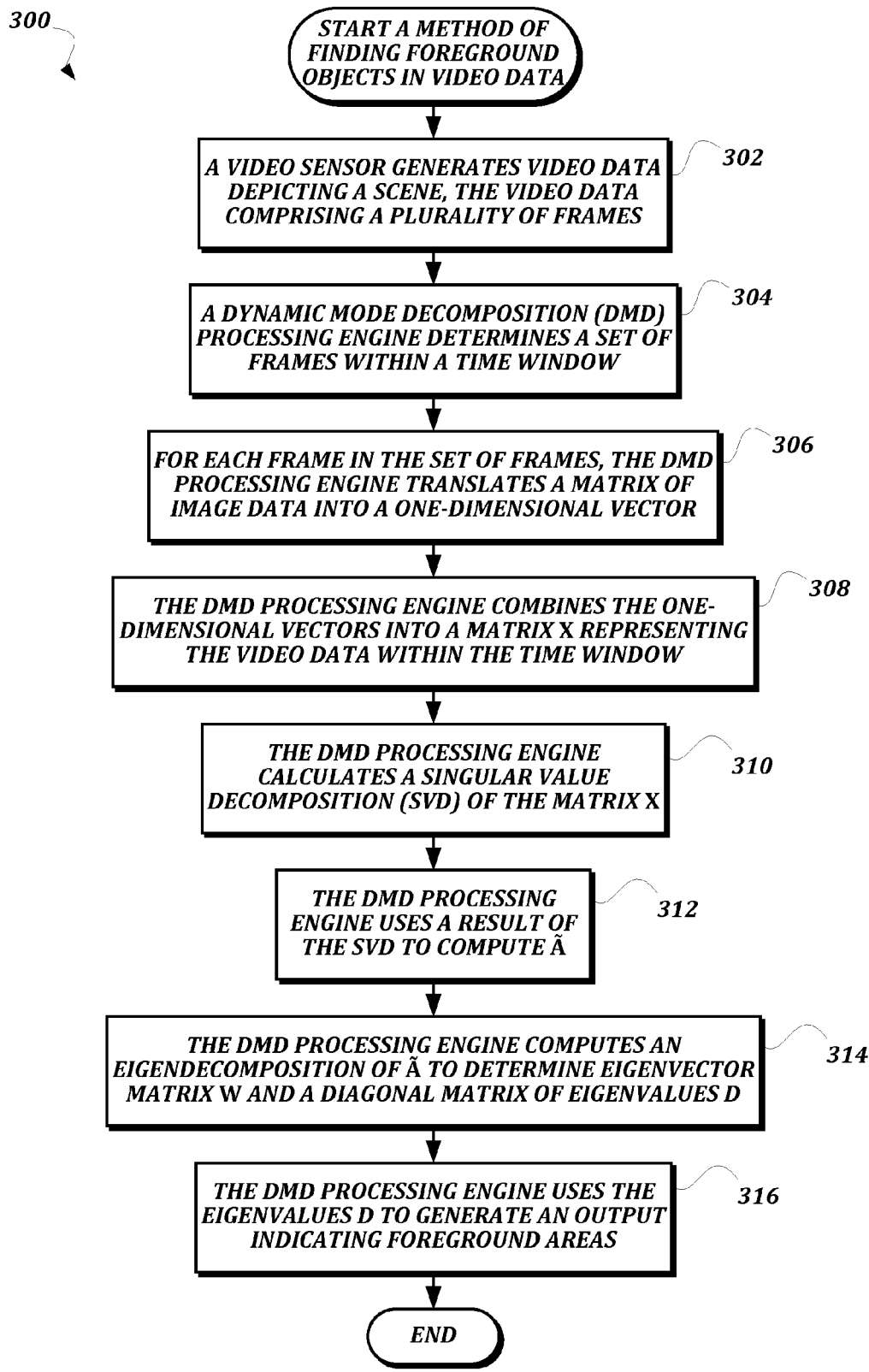
FIG. 3 is a flowchart that illustrates an exemplary embodiment of a method of finding foreground objects in video data according to various aspects of the present disclosure.

FIG. 3 is a flowchart that illustrates an exemplary embodiment of a method of finding foreground objects in video data according to various aspects of the present disclosure. From a start block, the method 300 proceeds to block 302, where a video sensor 102 generates video data depicting a scene, the video data comprising a plurality of frames. The video data may be in any suitable format from which frame-based pixel information may be recovered. The video sensor 102 provides the video data to a dynamic mode decomposition (DMD) processing engine 104, which stores it in at least a temporary memory location. In some embodiments, the video data may be stored in the raw video data store 203. Next, at block 304, a dynamic mode decomposition (DMD) processing engine 104 determines a set of frames within a time window. In some embodiments, the time window may be the entire length of the video data, in order to maximize the size of the slow modes that can be detected by the method 300. In this case, the set of frames would be all frames of the video data. In some embodiments, some other contiguous set of frames less than all frames may be used in order to fit within an available amount of memory, to reduce computation time, or for any other reason. For purposes of the following discussion, the frames in the set of frames within the time window will be referred to as frame 1 through frame m of the video data.

Next, at block 306, for each frame in the set of frames, the DMD processing engine 104 translates a matrix of image data into a one-dimensional vector. In some embodiments, each frame is a 2-D matrix having a height and a width, wherein each element has a red, green, and blue element. The DMD processing engine 104 creates the one-dimensional vector by vertically stacking the data from each row, such that the following simplified frame data:

$$X_1 = \begin{bmatrix} r_{1,1}; g_{1,1}; b_{1,1} & r_{2,1}; g_{2,1}; b_{2,1} & \ldots & r_{w,1}; g_{w,1}; b_{w,1} \\ r_{1,2}; g_{1,2}; b_{1,2} & r_{2,2}; g_{2,2}; b_{2,2} & \ldots & r_{w,2}; g_{w,2}; b_{w,2} \\ \vdots & \vdots & \ddots & \vdots \\ r_{1,h}; g_{1,h}; b_{1,h} & r_{2,h}; g_{2,h}; b_{2,h} & \ldots & r_{w,h}; g_{w,h}; b_{w,h} \end{bmatrix}$$

becomes the following one-dimensional vector:

$$X_1 = \begin{bmatrix} r_{1,1} \\ g_{1,1} \\ b_{1,1} \\ r_{1,2} \\ g_{1,2} \\ b_{1,2} \\ \vdots \\ r_{1,h} \\ g_{1,h} \\ b_{1,h} \\ r_{2,1} \\ g_{2,1} \\ b_{2,1} \\ \vdots \\ r_{w,h} \\ g_{w,h} \\ b_{w,h} \end{bmatrix}$$

In some embodiments, each value is stacked into a single vector as outlined above. In some embodiments, the red, green, and blue elements may be placed in separate vectors and processed separately. In some embodiments, video data may be generated, stored, and processed in a format other than red-green-blue, such as black-white, YPbPr, and/or any other suitable format.

At block 308, the DMD processing engine 104 combines the one-dimensional vectors into a matrix X representing all the video data within the time window.

$$X = [X_1 X_2; \ldots X_m]$$

Next, at block 310, the DMD processing engine 104 calculates a singular value decomposition (SVD) of the matrix X. Specifically, the DMD processing engine 104 calculates the SVD of a subset of X, for frames 1 through m−1:

$$X_1^{m-1} = U\Sigma V^*$$

where * denotes the conjugate transpose, $U \in \mathbb{C}^{N \times K}$, $\Sigma \in \mathbb{C}^{K \times K}$, and $V \in \mathbb{C}^{(M-1) \times K}$. Here K is the rank of the reduced SVD approximation to $X_1^{m-1}$. The left singular vectors U are proper orthogonal decomposition (POD) modes. The SVD reduction could also be exploited at this stage in the method 300 to perform a low-rank truncation of the data. Specifically, if low-dimensional structure is present in the data, the singular values of Σ will decrease sharply to zero with perhaps only a limited number of dominant modes. A principled way to truncate noisy data would be to use the hard-thresholding algorithm of Gavish and Donoho.

At block 312, the DMD processing engine 104 uses a result of the SVD to compute Ã, which is a K×K projection of the full matrix A that represents changes between frames of the video data onto POD modes:

$$\tilde{A} = U^* A U = U^* X_2^m V \Sigma^{-1}$$

At block 314, the DMD processing engine 314 computes an eigendecomposition of Ã to determine eigenvector matrix W and a diagonal matrix of eigenvalues D:

$$\tilde{A} W = W D$$

where columns of W are eigenvectors and D is a diagonal matrix containing the corresponding eigenvalues $\lambda_k$.

Next, at block 316, the DMD processing engine 316 uses the eigenvalues D to generate an output indicating foreground areas. In particular, the eigendecomposition of the full matrix that represents changes between frames of the video data can be reconstructed from W and D. That is, the eigenvalues are given by D, and the eigenvectors (DMD modes) are given by columns of Ψ:

$$\Psi = X_2^m V \Sigma^{-1} W$$

This equation differs from traditional formulas that define a DMD, but they will tend to converge if $X_1^{m-1}$ and $X_2^m$ have the same column spaces. With low-rank approximations of both the eigenvalues and eigenvectors in hand, the projected future solution can be constructed for all time in the future. By first rewriting for convenience $\omega_k = \ln/\Delta t$, then the approximate solution at all future times, $x_{DMD}(t)$, is given by:

$$x_{DMD}(t) = \sum_{k=1}^{K} b_k(0) \psi_k(\xi) \exp(\omega_k t) = \Psi \text{diag}(\exp(\omega t)) b$$

where ξ are the spatial coordinates, $b_k(0)$ is the initial amplitude of each mode, Ψ is the matrix whose columns are the eigenvectors $\psi_k$, diag($\omega$t) is a diagonal matrix whose entries are the eigenvalues exp($\omega_k$t), and b is a vector of the coefficients $b_k$.

An alternative interpretation of this equation is that it represents the least-square fit, or regression, of a linear dynamical system to the data sampled. It only remains to compute the initial coefficient values $b_k(0)$. If we consider the initial snapshot $X_1$ at time $t_1=0$, then the equation above gives $X_1=\Psi b$. This generically is not a square matrix so that its solution:

$$b=\Psi^+ X_1$$

can be found using a pseudo-inverse. Indeed, $\Psi^+$ denotes the Moore-Penrose pseudo-inverse that can be accessed in MATLAB via the pinv command. The pseudo-inverse is equivalent to finding the best solution b in the least-squares (best fit) sense.

Once these values are in hand, the DMD processing engine 104 can generate a foreground and/or background video feed using the resulting data. In some embodiments, the foreground video feed would show the foreground elements with the background blacked out due to the background containing zero values. In some embodiments: the zero elements determined to be part of the background could be added to an alpha channel, or could be changed to something other than zero, like a value that indicates white or some other color, or replaced with data from some other video or still image. In some embodiments, the foreground video feed and/or background video feed may be provided to a display device 216, or may be stored in the processed video data store 204. The method 300 then proceeds to an end block and terminates.

One of ordinary skill in the art will recognize that the above actions described as being performed by the DMD processing engine 104 could, in some embodiments, be performed by the video processing computing device 202 described above.

Overall then, the DMD technique presented above takes advantage of low dimensionality in the data in order to make a low-rank approximation of the linear mapping that best approximates the nonlinear dynamics of the data collected for the system. Once this is done, a prediction of the future state of the system is achieved for all time. Unlike the POD-Galerkin method, which requires solving a low-rank set of dynamical quantities to predict the future state, no additional work is required for the future state prediction outside of plugging in the desired future time into the equation above. Thus the advantages of using DMD include the facts that (i) it is an equation-free architecture, and (ii) a future state prediction is known for any time t provided the DMD approximation holds.

More broadly, the DMD technique has been shown to be a highly successful method for foreground/background subtraction in video feeds. Indeed, the DMD method is a novel, dynamical systems base method for performing a robust Principal Components Analysis (RPCA) of data streams. Importantly, the DMD-based RPCA performs the low-rank/sparse matrix separation 3-4 orders of magnitude faster than previously known $L_1$ optimization methods.

Figure 4A:
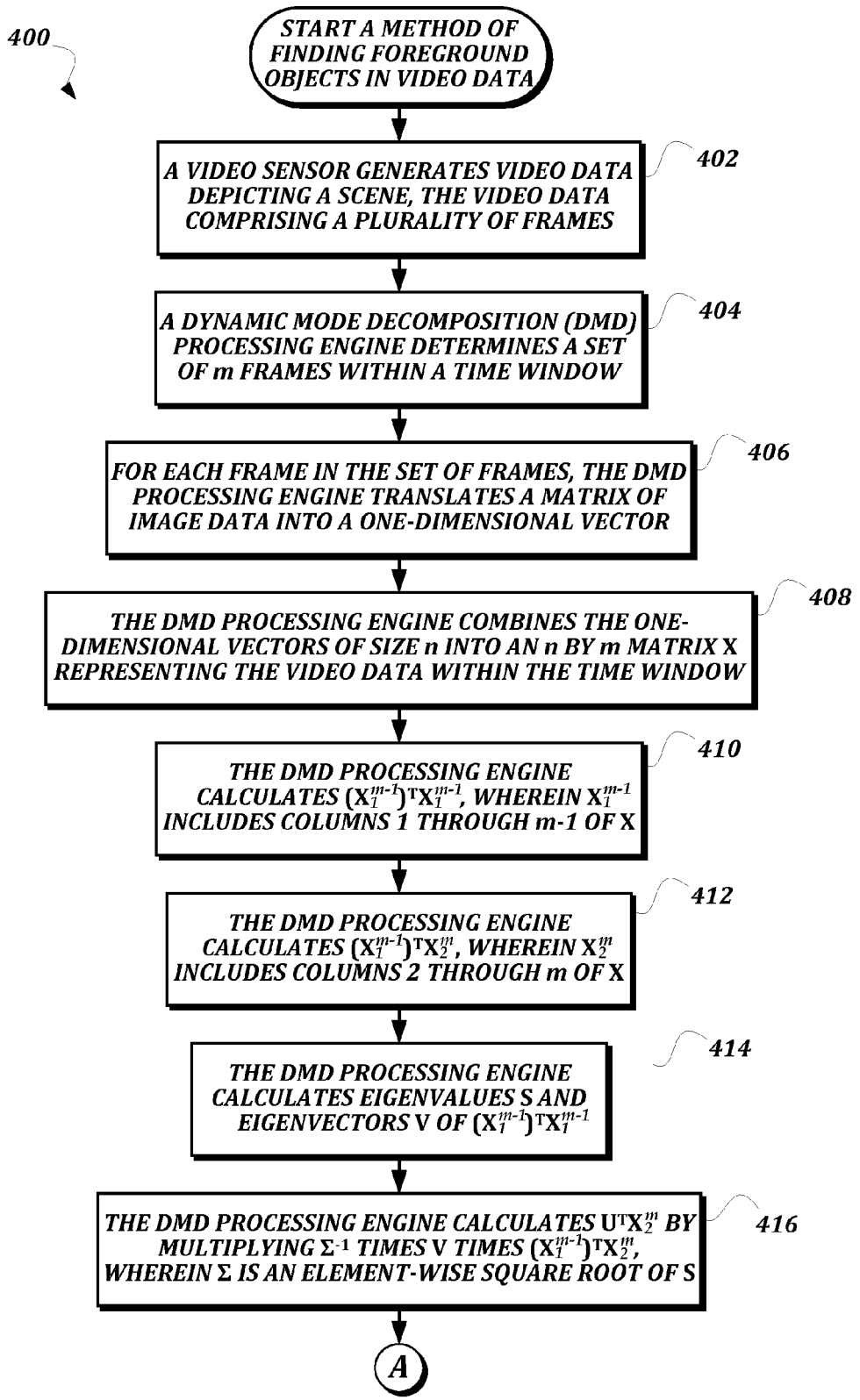
FIGS. 4A-4C are a flowchart that illustrates another exemplary embodiment of a method of finding foreground objects in video data according to various aspects of the present disclosure.
Figure 4B:
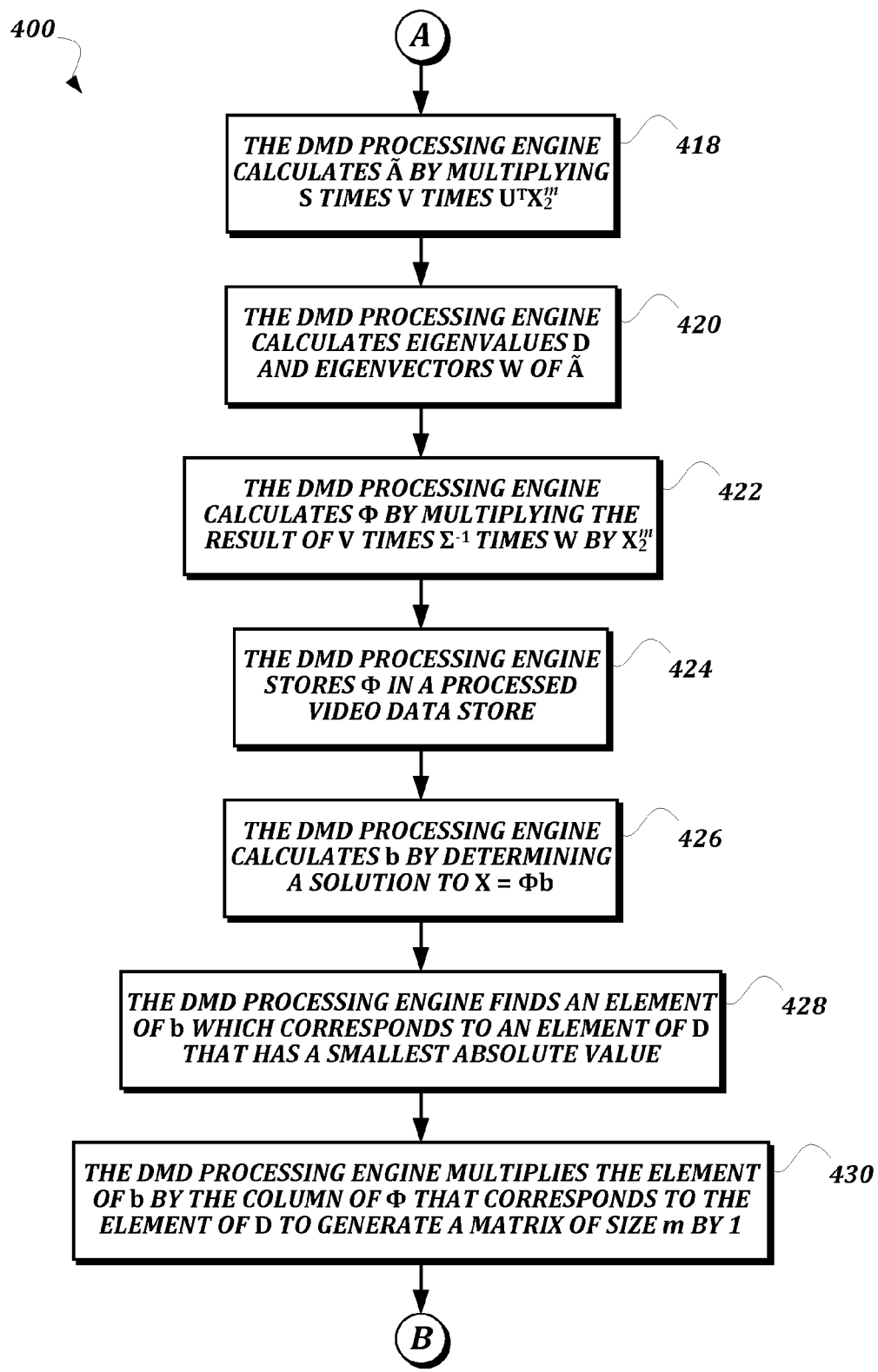
Figure 4C:
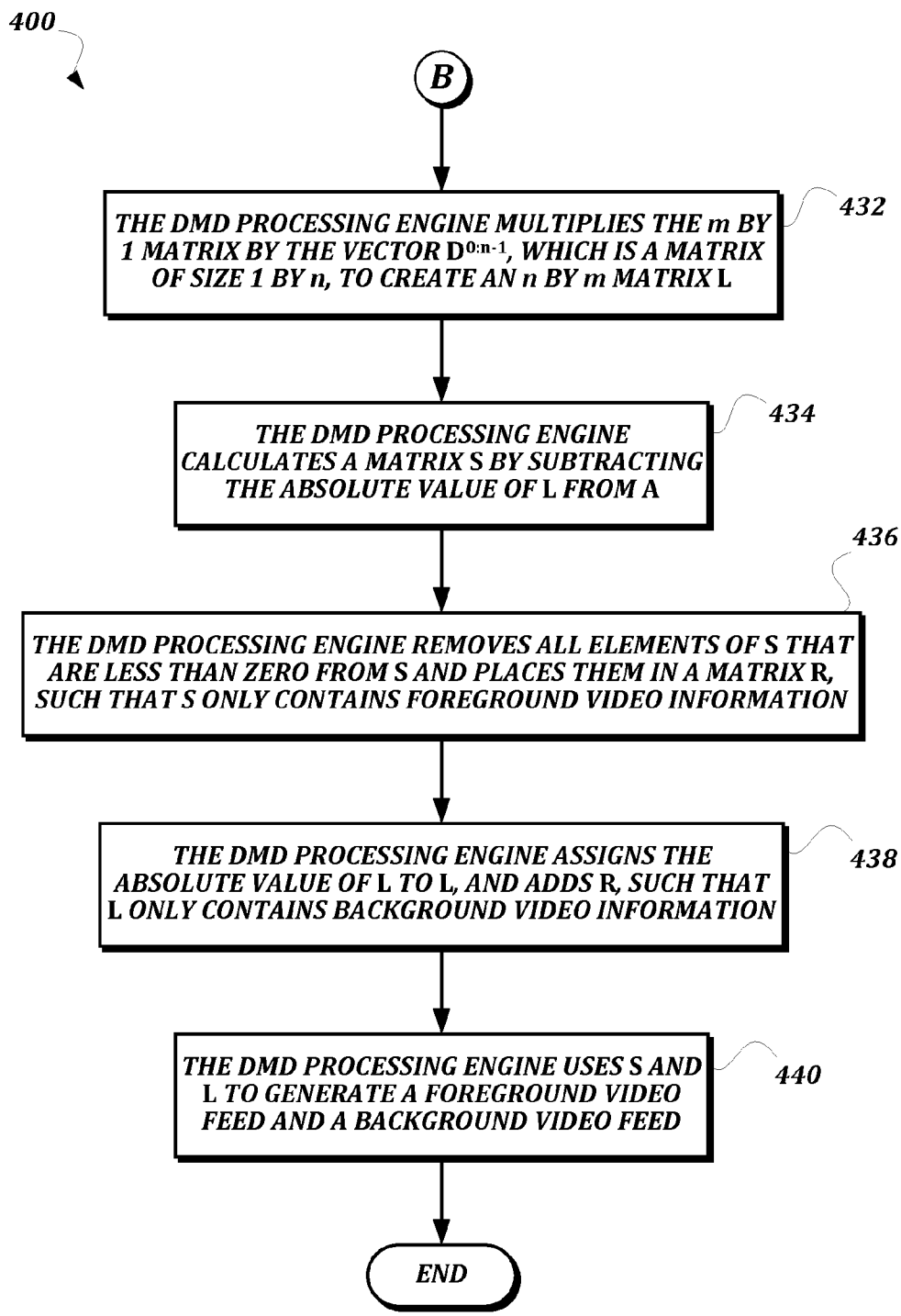

The flowchart in FIG. 3 illustrates the formal basis of the techniques disclosed herein, and provides a robust version of an implementation of the techniques. In some embodiments, the techniques may be further optimized by approximating some of the calculations, instead of, for example, calculating an entire SVD of X. FIGS. 4A-4C are a flowchart that illustrates another exemplary embodiment of a method of finding foreground objects in video data according to various aspects of the present disclosure. The method 400 includes optimizations that allow the foreground information and background information to be separated more quickly than in the more general method 300 described above. The method 400 also isolates calculations that can be split between a CPU 206 and a GPU 210 for further performance enhancements, as discussed further below with respect to FIG. 5.

From a start block (FIG. 4A), the method 400 proceeds to block 402, where a video sensor 102 generates video data depicting a scene, the video data comprising a plurality of frames. At block 404, the DMD processing engine 104 determines a set of m frames within a time window. Next, at block 406, for each frame in the set of frames, the DMD processing engine 104 translates a matrix of image data into a one-dimensional vector, and at block 408, the DMD processing engine 104 combines the one-dimensional vectors of size n into an n×m matrix X representing the video data within the time window. The actions performed in blocks 402-408 are similar to the actions described above with respect to blocks 302-308, though the description of blocks 402-408 includes indicators of size that will be used later.

Next, the method proceeds to block 410, where the DMD processing engine 104 calculates $(X_1^{m-1})^T X_1^{m-1}$, or the transpose of matrix $X_1^{m-1}$ times the matrix $X_1^{m-1}$, wherein the matrix $X_1^{m-1}$ includes columns 1 through m−1 of matrix X. At block 412, the DMD processing engine 104 calculates $(X_1^{m-1})^T X_2^m$, or the transpose of matrix $X_1^{m-1}$ times the matrix $X_2^m$, wherein the matrix $X_2^m$ includes columns 2 through m of matrix X.

At block 414, the DMD processing engine 104 calculates eigenvalues S and eigenvectors V of $(X_1^{m-1})^T X_1^{m-1}$. Next, at block 416, the DMD processing engine 104 calculates $U^T X_2^m$ by calculating an element-wise square root of S, and multiplying the inverse of that matrix ($\Sigma^{-1}$) by V by $(X_1^{m-1})^T X_2^m$. In other words:

$$\Sigma = A^{\circ 1/2}$$

$$U^T X_2^m = \Sigma^{-1} V (X_1^{m-1})^T X_2^m$$

In some embodiments, these calculations can be accelerated by using a snapshot technique. In the snapshot technique, most of $(X_1^{m-1})^T X_2^m$ is not recalculated from X, but instead $(X_1^{m-1})^T X_1^{m-1}$ is transformed to solve most of the multiplication. In some embodiments, $(X_1^{m-1})^T X_2^m$ is instead created by shifting all elements of $(X_1^{m-1})^T X_1^{m-1}$ one column to the left, and then generating only the rightmost column of $(X_1^{m-1})^T X_2^m$ using the rightmost column of X.

The method 400 then proceeds to a continuation terminal ("terminal A"). From terminal A (FIG. 4B), the DMD processing engine 104 calculates $\tilde{A}$ by multiplying S times V times $U^T X_2^m$. In other words:

$$\tilde{A} = SVU^{TX_2^m}$$

At this point, the method 400 has calculated $\tilde{A}$, which is a similar point to block 312 in method 300. The calculation of $\tilde{A}$ in method 400 may come to a slightly different result due to computing only an approximate SVD of X, as opposed to the full SVD computed in method 300. The differences between the two results are negligible for the purposes of separating foreground and background information from video data, however, and the increase in performance by making this approximation is desirable.

At block 420, the DMD processing engine 104 calculates eigenvalues D and eigenvectors W of $\tilde{A}$, and at block 422, the DMD processing engine 104 calculates a matrix Φ by obtaining the result of V times $\Sigma^{-1}$ times W, and multiplying $X_2^m$ times that result. In other words:

$$\Phi = X_2^m (V\Sigma^{-1} W)$$

Next, at block 424, the DMD processing engine 104 stores Φ in a processed video data store 204. This matrix is stored in the processed video data store because generating it is computationally expensive, and the remainder of the calculations used to generate foreground and background information from Φ can be repeated relatively inexpensively if necessary. In some embodiments, instead of storing Φ, the method 400 may instead store the original image sequence and $V\Sigma^{-1}W$ in order to save storage space. $V\Sigma^{-1}W$ is of size (n−1) times (n−1) per set of frames, while Φ is of size m times (n−1). Further, if only the column of Φ corresponding to the background is needed, only a single column of $V\Sigma^{-1}W$ need be calculated and stored. This saves computations and reduces the memory needed to transfer and store $V\Sigma^{-1}W$ to (n−1).

At block 426, the DMD processing engine 104 calculates b by determining a solution to X=Φb. The method 400 then proceeds to block 428, where the DMD processing engine 104 finds an element of the vector b which corresponds to an element of the eigenvalues D that has a smallest absolute value. At block 430, the DMD processing engine 104 multiplies the element of b by the column of Φ that corresponds to the corresponding element of D to generate a matrix of size m×1. The method 400 then proceeds to a continuation terminal ("terminal B").

From terminal B (FIG. 4C), the method 400 proceeds to block 432, where the DMD processing engine 104 multiplies the m by 1 matrix by the vector $D^{0:n-1}$, which is a matrix of size 1×n, to create an n by m matrix L. At block 434, the DMD processing engine 104 calculates a matrix S by subtracting the absolute value of L from A. The method 400 then proceeds to block 436, where the DMD processing engine 104 removes all elements of S that are less than zero from S and places them in a matrix R, such that S only contains foreground video information. At block 438, the DMD processing engine 104 assigns the absolute value of L to L, and adds R, such that L only contains background video information.

The method 400 proceeds to block 440, where the DMD processing engine 104 uses S and L to generate a foreground video feed and a background video feed. In some embodiments, S and/or L, or the foreground video feed and/or the background video feed generated therefrom, may be stored in the processed video data store 204. In some embodiments, S and/or L may be used to generate the foreground video feed and/or the background video feed for immediate display on the display device 216. The method 400 then proceeds to an end block and terminates.

FIG. 5 is a table that illustrates details of how computations of a method of finding foreground objects in video data may be accelerated by using both a central processing unit (CPU) and a graphical processing unit (GPU) in an exemplary embodiment of the present disclosure. In the table the "CPU" column indicates actions taken by the CPU 206 of a video processing computing device 202 embodiment of a DMD processing engine 104, and the "GPU" column indicates actions taken by the GPU 210 of the video processing computing device 202. The "memory transfers" column indicates actions wherein data is either copied from the main memory 208 to the graphics memory 214, or from the graphics memory 214 to the main memory 208. Time elapses in the table in the downward direction, such that operations that are illustrated as below a first operation must wait for the first operation to complete before proceeding, and operations that are illustrated at the same or overlapping horizontal levels may be performed at the same time.

In some embodiments where the GPU 210 supports the OpenCL language, out-of-order execution is enabled for the OpenCL command queue. This means that the memory transfers and GPU calculations illustrated in the table may execute simultaneously if all of their respective prerequisites have finished. This allows $X_2^m$ to be calculated by the GPU 210 while the CPU 206 is calculating eigenvalues and eigenvectors of $(X_1^{m-1})^T X_1^{m-1}$. In some embodiments, the eigenvalues and eigenvectors are calculated on the CPU 206 instead of the GPU 210 for this reason, as well as for other reasons. For example, running the matrix through an eigensolver on the CPU is fast because the snapshot technique may be used on tall-skinny matrices, such that $(X_1^{m-1})^T X_1^{m-1}$ will be significantly smaller than $X_1^{-1}$. Additionally, the CPU 206 can be configured to use multiple relatively robust representations (MRRR) to find the eigenvalues, which is the fastest available eigensolver.

Figure 6:
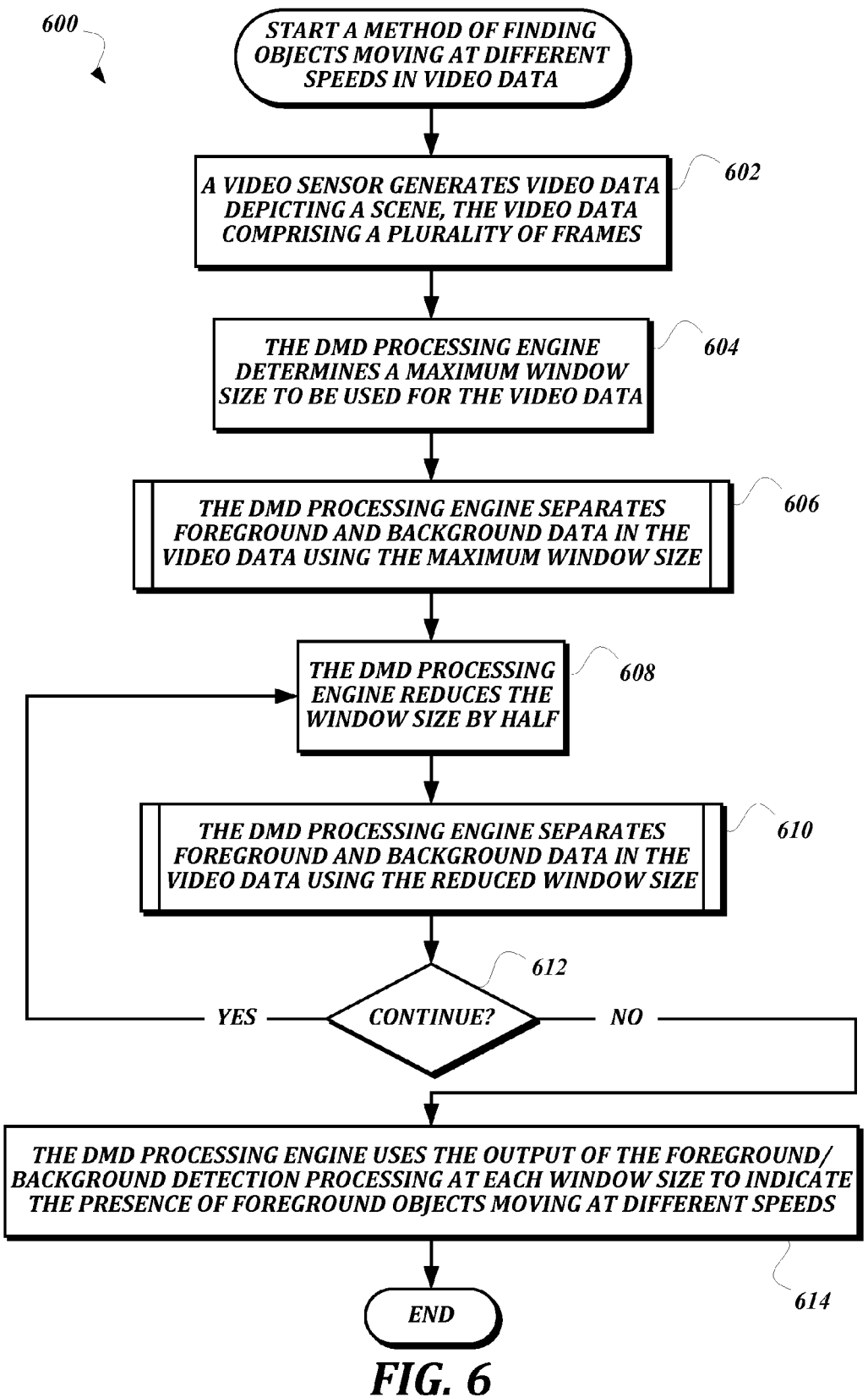
FIG. 6 is a flowchart that illustrates a method of finding objects moving at different speeds in video data according to various aspects of the present disclosure.

FIG. 6 is a flowchart that illustrates a method of finding objects moving at different speeds in video data according to various aspects of the present disclosure. This multi-resolution technique is inspired by the observation that the slow and fast modes can be separated for such applications as foreground/background subtraction in video feeds. This technique recursively removes low-frequency, or slowly varying, content from a given collection of snapshots. Typically, the number of snapshots are chosen so that the DMD modes provide an approximately full rank approximation of the dynamics observed. Thus the number of snapshots is chosen so that all high- and low-frequency content is present. IN the present technique, the number of snapshots is originally chosen in the same way so that an approximate full rank approximation can be accomplished. From this initial pass through the data, the slowest modes are removed, and the domain is divided into two segments with half the number of snapshots each. DMD is once again performed on each of the two segments. Again the slowest modes are removed and the algorithm is continued until a desired termination. One advantage of this technique is that different spatio-temporal DMD modes are used to represent key multi-resolution features. Thus, there is not a single set of modes that dominates the SVD and potentially marginalizes features at other time scales.

From a start block, the method 600 proceeds to block 602, where a video sensor 102 generates video data depicting a scene, the video data comprising a plurality of frames. As before, this is similar to block 302 illustrated and described above. Next, at block 604, the DMD processing engine 104 determines a maximum window size to be used for the video data. In some embodiments, if there are m frames of video data, the maximum determined window size may be the entire window of m frames. In some embodiments, the video data may be extremely long, and the maximum determined window size may be smaller than the entire video data, but will be chosen such that it should include the entirety of any slowly changing event (such as, for example, an entire cycle of illumination changes). The method 600 then proceeds to a procedure block 606, where the DMD processing engine 104 separates foreground and background data in the video data using the maximum window size. Any suitable procedure may be used for the foreground/background separation, such as the method 300 or the method 400 described above.

Next, at block 608, the DMD processing engine 104 reduces the window size by half, and at block 610, the DMD processing engine 104 separates foreground and background data in the video data using the reduced window size. Again, any procedure may be used for the foreground/background separation, such as methods 300 or 400 described above. In some embodiments, the method used for procedure block 606 will match the method used for procedure block 610, but for the window sized used. As one will note, because the window size has been halved, the DMD processing engine 104 will need to run twice to cover the two windows that now fit in the original maximum window size.

The method 600 then proceeds to a decision block 612, where a determination is made regarding whether to continue. In some embodiments, the determination may be based on whether a fixed number of iterations deemed to be adequate to provide a high enough resolution have been performed. In some embodiments, the determination may be based on a window size of the next iteration, and may determine to stop if the next window size is below a threshold. For example, once a minimum number of frames required for the procedure 610 to work, such as two frames, is no longer present in the subsequent window size, then the determination to stop may be made.

Accordingly, if the determination to continue at decision block 612 is YES, then the method 600 returns to block 608. Otherwise, if the determination to continue is NO, then the method 600 proceeds to block 614, where the DMD processing engine 104 uses the output of the foreground/background detection processing at each window size to indicate the presence of foreground objects moving at different speeds. In some embodiments, the output at each window size may be combined to create an overall foreground feed and/or an overall background feed, the accuracy of which is improved by virtue of the multiple resolution processing. The method 600 then proceeds to an end block and terminates.

When computing a DMD on a live feed of video data or a video stream, computation of many SVDs on data matrices with significant overlap is performed. Using the method of snapshots, it is possible to reuse many of the shared inner-products between neighboring SVDs, thus avoiding redundant computations. For example, FIG. 7 illustrates matrices that that exhibit this overlap. The top matrix illustrates the SVD of the matrix $X_1^m$. The dotted box around the elements at the bottom right of the matrix indicates elements that will be redundant inner-products in the next SVD of the matrix $X_2^{m+1}$. This next SVD is illustrated in the bottom matrix. It is noted that by storing the inner-products within the dashed box, only the row and column lying outside of the box need to be computed for the lower SVD, thus greatly reducing the complexity of the operation from $O(m^2n)$ to $O(mn)$.

Figure 8:
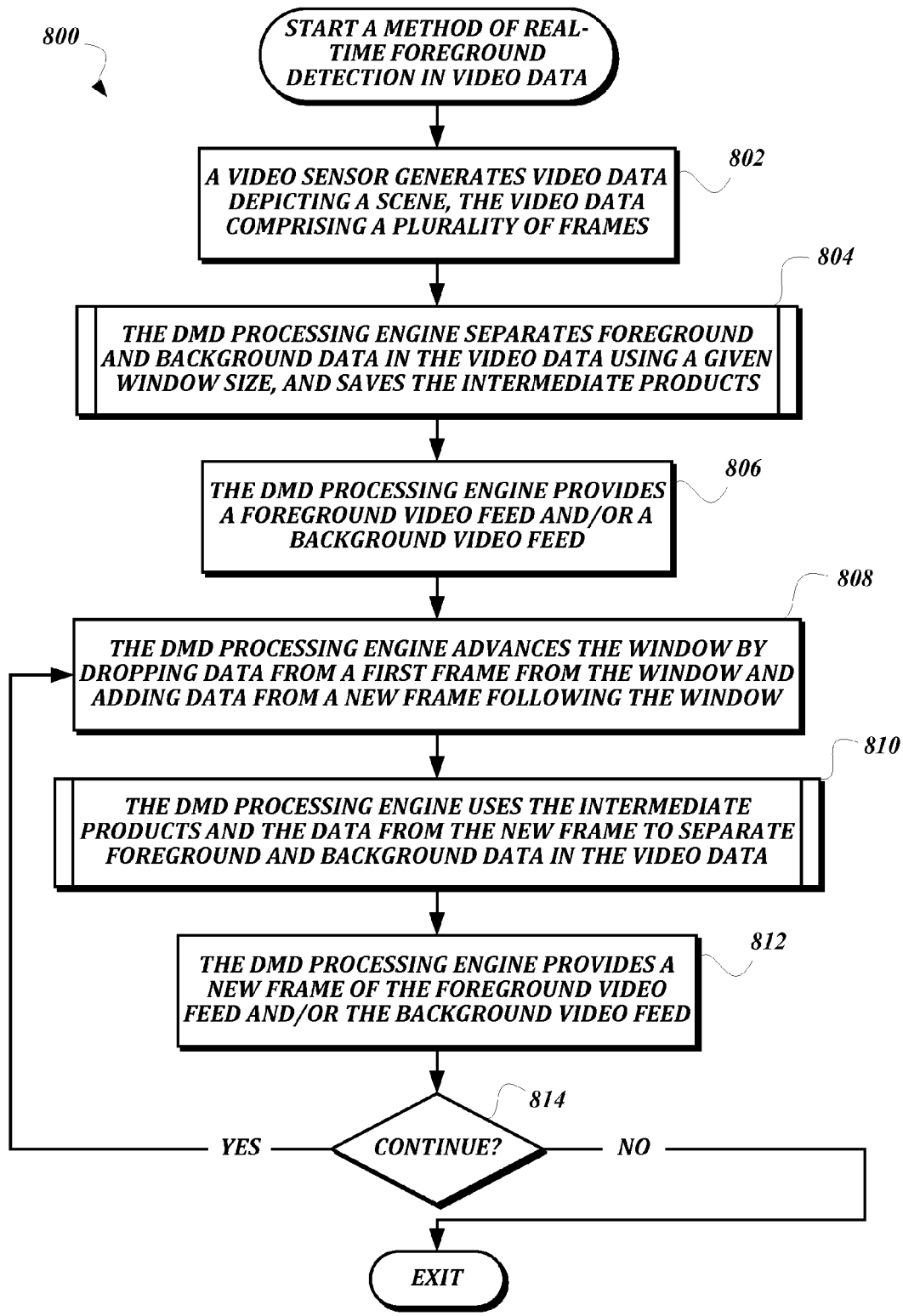
FIG. 8 is a flowchart that illustrates an exemplary embodiment of a method of real-time foreground detection in video data according to various aspects of the present disclosure.

FIG. 8 is a flowchart that illustrates an exemplary embodiment of a method of real-time foreground detection in video data according to various aspects of the present disclosure. From a start block, the method 800 proceeds to block 802, where a video sensor 102 generates video data depicting a scene, the video data comprising a plurality of frames. Next, at procedure block 804, the DMD processing engine 104 separates foreground and background data in the video data using a given window size, and saves the intermediate products. One of ordinary skill in the art will recognize that either method 300 or method 400 described above could be used in procedure block 804, though using method 400 will provide even further performance benefits. If using method 300, the results of the SVD may be saved as indicated in the upper matrix of FIG. 7. If using method 400, X, $X_1^{m-1}$, and/or $(X_1^{m-1})^T X_2^m$ may be saved as the intermediate products. The method 800 then proceeds to block 806, where the DMD processing engine 104 provides a foreground video feed and/or a background video feed. One of ordinary skill in the art will recognize that the actions performed in block 806 are similar to the actions described above with respect to block 316 or 440, and so are not described in further detail here for the sake of brevity.

Next, at block 808, the DMD processing engine 104 advances the window by dropping data from a first frame from the window and adding data from a new frame following the window. At procedure block 810, the DMD processing engine uses the intermediate products and the data from the new frame to separate foreground and background data in the video data, and at block 812, the DMD processing engine 104 provides a new frame of the foreground video feed and/or the background video feed. Methods similar to either method 300 or method 400 may again be used in procedure block 810, though the method used in block 810 should match the method used in block 804. However, the method used is updated slightly to reuse the intermediate results from the previous computation, thus allowing the computations to occur fast enough to provide a video feed in real time.

If method 300 is used, the intermediate results are used by shifting the results of the SVD up one row and to the left one column, as illustrated in the lower matrix in FIG. 7, and then only calculating the SVD results for the bottom row and the rightmost column based on the new frame data. If method 400 is used, multiple efficiencies may be exploited to improve the performance of the method for procedure block 810. For example, $(X_1^{m-1})^T X_1^{m-1}$ may not be fully recalculated. Instead, $(X_1^{m-1})^T X_1^{m-1}$ is computed by shifting the previous $(X_1^{m-1})^T X_2^m$ up one row, and recalculating solely the elements that are made by the new column that had been added to X by the new frame data.

Additional efficiencies can be gained in embodiments wherein actions are split between the CPU 206 and the GPU 210. As one example, the matrix X may not be transferred to the graphics memory 214 in its entirety after the initial transfer. Instead, only the new column based on the new frame data is transferred to the graphics memory 214. Further, instead of physically shifting X in memory to add the new column, an index may be kept that indicates which column of X is the physical start, and the index modulus the number of columns of X gives the physical start in memory. This index is incremented before each new frame is added, and the new frame data is added to the memory as appropriate based on the index.

Even more efficiencies can be found by utilizing the GPU 210 in a clever manner. For example, Φ can be calculated on the GPU 210 and transferred back to main memory 208 for access by the CPU 206. If only the column of Φ corresponding to the background is needed, then only a single column of m elements need be calculated, transferred, and/or stored in the processed video data store 204. This transfer can still take a long time, however. This lag can be compensated for by queueing Φ for transfer to main memory 208, and proceeding to perform calculations on the GPU 210 for the next frame while Φ is being transferred. For example, the kth frame will be computed while the k–Ith Φ is transferred to main memory 208. If L and S are to be transferred to main memory 208 as well, then their transfer can be queued and done in parallel with the processing of a subsequent frame in a similar manner.

As another example, L and S are initially stored after calculation by the GPU 210 in the graphics memory 214. If L or S are being used in the method 812 for generating an immediate video feed of background or foreground data (as opposed to transferring them to main memory 208 for eventual storage in the processed video data store 204), then the GPU 210 may use L and/or S to immediately create and send the video feed to the display device 216 without waiting to transfer them back to main memory 208. In such a case, the background may only need to be removed from the most recently added frame, and so only one column of L may need to be calculated and stored.

From block 812, the method 800 then proceeds to a decision block 814, where a determination is made regarding whether or not to continue. In some embodiments, the determination will be based primarily on whether or not the DMD processing engine 104 is still receiving video data, or is otherwise still active. If the DMD processing engine 104 is still receiving video data and/or otherwise remains active, then the result of the determination at decision block 814 is YES, and the method 800 returns to block 808 to process the next frame of video data. Otherwise, the result of the determination at decision block 814 is NO, and the method 800 proceeds to an end block and terminates.

While illustrative embodiments have been illustrated and described, it will be appreciated that various changes can be made therein without departing from the spirit and scope of the invention.

EXAMPLES

Some exemplary embodiments of the present disclosure may be defined as follows:
1. A computer-implemented method of separating foreground information and background information in video data, the method comprising:
   generating, by a video sensor, video data that includes a set of video frames;
   determining a first window within the video data, wherein the first window indicates a portion to be analyzed of the video data;
   detecting foreground information and background information within the first window of video data by:
      calculating, by a computing device, an approximation of a singular value decomposition (SVD) of data within the first window;
      generating a matrix $\tilde{A}$ using the approximation of the SVD, wherein $\tilde{A}$ represents a K×K projection of a matrix A onto proper orthogonal decomposition (POD) modes, and wherein the matrix A represents changes between video frames within the first window;
      performing an eigendecomposition of matrix $\tilde{A}$ to determine an eigenvector matrix W and a diagonal matrix of eigenvalues D; and
      using the eigenvectors W and eigenvalues D to generate indications of at least one of foreground information and background information in the first window; and
   generating an output based on at least one of the indication of foreground information and the indication of background information in the first window;
   wherein the first window of video data is represented by a matrix X that includes video frames 1 to m.
2. The method of Example 1, wherein calculating the approximation of an SVD of data within the first window includes using a snapshot technique.
3. The method of Example 2, wherein the snapshot technique includes:
   calculating $(X_1^{m-1})^T X_1^{m-1}$;
   calculating eigenvalues S and eigenvectors V of $(X_1^{m-1})^T X_1^{m-1}$; and
   using S and V to calculate $U^T X_2^m$.
4. The method of Example 3, wherein using S and V to calculate $U^T X_2^m$ includes:
   moving all elements of $(X_1^{m-1})^T X_1^{m-1}$ one column to the left to generate $(X_1^{m-1})^T X_2^m$ minus a rightmost column; and
   calculating the rightmost column of $(X_1^{m-1})^T X_2^m$ using video data from frame m.
5. The method of Example 4, wherein using S and V to calculate $U^T X_2^m$ further includes:
   generating $\Sigma$, which is an element-wise square root of S; and
   multiplying $\Sigma^{-1}$ times V times $(X_1^{m-1})^T X_2^m$ to generate $U^T X_2^m$.
6. The method of any of Examples 3-5, wherein generating the matrix $\tilde{A}$ includes:
   multiplying S, V, and $U^T X_2^m$ from the SVD.
7. The method of any of Examples 3-6, wherein using the eigenvectors W and eigenvalues D to generate indications of at least one of foreground information and background information in the first window includes:
   calculating V times $\Sigma^{-1}$ times W.
8. The method of Example 7, further including storing the result of V times $\Sigma^{-1}$ times W for future use.
9. The method of any of Examples 7-8, further including calculating $\Phi$ by taking $X_2^m$ times the result of V times $\Sigma^{-1}$ times W.
10. The method of Example 9, further including:
    calculating L, wherein L is a low-rank matrix that represents background video information from the video data.
11. The method of Example 10, wherein calculating L includes:
    calculating b, which is a vector that is the solution to $X = \Phi b$;
    finding an element of b which corresponds to an element of D that has the smallest absolute value;
    multiplying the found element of b times the column of $\Phi$ that corresponds to the element of D to get a matrix of size m×1; and
    multiplying the m×1 matrix by the vector $D^{0:n-1}$, which is a matrix of size 1×n and each element represents D to the power of an amount of time that has elapsed for an associated column since a first column, such that the result (L) is a matrix of the same rank as X.
12. The method of Example 11, wherein generating an output based on the indication of foreground information includes:
    calculating S, wherein S is a sparse matrix that represents foreground video information from the video data, by subtracting the absolute value of L from A;
    generating a matrix R by collecting all elements of S which are less than zero;
    removing the contents of the matrix R from S; and
    outputting or storing video data based on S that represents foreground elements of the video data.
13. The method of Example 12, wherein generating an output based on the indication of background information includes:
    updating L by taking the absolute values of the elements from L and adding R to L; and
    outputting or storing video data based on L that represents background elements of the video data.
14. The method of any of Examples 11-13, wherein b is calculated by determining a least-squares fit.

15. The method of any of Examples 1-14, further comprising, for each video frame in the first window, organizing two-dimensional data from the frame into a one-dimensional vector.
16. The method of Example 15, further comprising combining the one-dimensional vectors for the first window into a two-dimensional matrix.
17. The method of any of Examples 1-16, wherein using the eigenvalues W and eigenvectors D to generate indications of at least one of foreground information and background information in the first window includes:
comparing the eigenvalues W to a eigenvalue threshold; and
for each eigenvector D corresponding to an eigenvalue W greater than the threshold, assigning the eigenvector to a set of eigenvectors associated with the foreground.
18. The method of any of Examples 1-17, wherein the output based on at least one of the indication of foreground information and the indication of background information in the first window comprises an alpha video channel.
19. The method of any of Examples 1-18, wherein video data is generated and processed separately for at least one of a red channel, a green channel, and a blue channel.
20. The method of any of Examples 1-19, wherein data from multiple color channels is combined for processing in a single matrix.
21. The method of any of Examples 1-20, further comprising:
determining a second window within the video data, wherein the second window has a size that is half of a size of the first window; and
detecting foreground information and background information within each second window of the video data.
22. The method of Example 21, wherein a first eigenvalue threshold used to detect foreground information and background information in the first window is different from a second eigenvalue threshold used to detect foreground information and background information in the second window.
23. The method of any of Examples 21-22, wherein an eigenvalue threshold used to detect foreground information and background information in the second window is based on the eigenvalues determined for the first window.
24. The method of any of Examples 21-23, further comprising repeatedly determining smaller windows and detecting foreground information and background information within each smaller window within the video data until a minimum window size is processed.
25. The method of Example 24, wherein the minimum window size is two frames.
26. A computer-implemented method of detecting motion in streaming video data, the method comprising:
receiving a stream of video data;
detecting motion within a first window of the stream of video data, the first window including a sequential set of video frames; and
detecting motion within a subsequent window of the stream of video data, wherein the subsequent window overlaps at least a portion of the first window;
wherein detecting motion within the subsequent window includes reusing results of computations performed during the detection of motion within the first window.

27. The method of Example 26, wherein detecting motion within a first window of the stream of video data includes computing an approximation of a singular value decomposition (SVD) of video data within the first window.
28. The method of Example 27, wherein reusing results of computations performed during the detection of motion within the first window includes reusing redundant inner-products of the approximation of the SVD of video data within the first window as part of a computation of an approximation of an SVD of video data within the subsequent window.
29. A computing device for separating foreground information and background information in video data, the device comprising:
a central processing unit (CPU);
a main memory;
a graphics processing unit (GPU) having a graphics memory and a plurality of processing cores; and
a nontransitory computer-readable medium having computer-executable instructions stored thereon that, in response to execution by one or more processors of the computing device, cause the computing device to separate foreground information and background information in video data by:
collecting an initial matrix X of video data, wherein the matrix X is of rank n×m, wherein m is a number of frames of data in the video data, and wherein n is an amount of data from each video frame;
calculating a matrix $(X_1^{m-1})^T X_1^{m-1}$, wherein $X_1^{m-1}$ is a matrix representing the video data in frames 1 to m−1;
calculating eigenvalues S and eigenvectors V of matrix $(X_1^{m-1})^T X_1^{m-1}$;
calculating a matrix $(X_1^{m-1})^T X_2^m$, wherein $X_2^m$ is a matrix representing the video data in frames 2 to m;
using S, V, and $(X_1^{m-1})^T X_2^m$ to calculate a matrix $\tilde{A}$;
calculating eigenvalues D and eigenvectors W of matrix $\tilde{A}$; and
using D and W to generate indications of at least one of foreground information and background information in the video data.
30. The computing device of Example 29, wherein the instructions cause the computing device to use the GPU to calculate the matrices $(X_1^{m-1})^T X_1^{m-1}$, $(X_1^{m-1})^T X_2^m$, and $\tilde{A}$; and wherein the instructions cause the computing device to use the CPU to calculate the eigenvalues S and D, and to calculate the eigenvectors V and W.
31. The computing device of Example 30, wherein the CPU calculates the eigenvalues S and eigenvectors V at least partially concurrently with the calculation by the GPU of the matrix $(X_1^{m-1})^T X_2^m$.
32. The computing device of any of Examples 29-31, wherein the instructions cause the computing device to use the GPU to use D and W to generate indications of at least one of foreground information and background information in the video data; wherein the indication of foreground information is a matrix S; and wherein the indication of background information is a matrix L.
33. The computing device of Example 32, wherein the instructions cause the computing device to use the GPU to output a video feed to a display device using at least one of matrix S or matrix L without copying the matrix S or the matrix L to the main memory.
34. The computing device of any of Examples 29-33, wherein the instructions further cause the computing device to analyze a subsequent frame of video data after the initial matrix X, by:
shifting all of the rows of $(X_1^{m-1})^T X_2^m$ up one row to generate a partial result of $(X_2^{m-1})^T X_2^m$; and
calculating the bottom row of $(X_2^{m-1})^T X_2^m$ based on data within the subsequent frame of video data.

35. The computing device of Example 34, wherein the instructions further cause the computing device to:
transfer a result of processing on the GPU to the main memory at least partially concurrently with processing of a subsequent frame by the GPU.

36. The computing device of Example 35, wherein the instructions further cause the computing device to:
transfer a result of processing of the subsequent frame by the GPU to the main memory, wherein the result includes a one-dimensional matrix.

37. The computing device of any of Examples 29-36, wherein calculating the matrix $(X_1^{m-1})^T X_2^m$ includes:
shifting all columns of the matrix $(X_1^{m-1})^T X_1^{m-1}$ one column to the left; and
calculating the rightmost column of $(X_1^{m-1})^T X_2^m$ based on the data of frame m.

The invention claimed is:

1. A computer-implemented method of separating foreground information and background information in video data, the method comprising:
generating, by a video sensor, video data that includes a set of video frames;
determining a first window within the video data, wherein the first window indicates a portion to be analyzed of the video data;
detecting foreground information and background information within the first window of video data by:
calculating, by a computing device, a singular value decomposition (SVD) of data within the first window;
generating a matrix $\tilde{A}$ using the results of the SVD, wherein $\tilde{A}$ represents a K×K projection of a matrix A onto proper orthogonal decomposition (POD) modes, and wherein the matrix A represents changes between video frames within the first window;
performing an eigendecomposition of matrix $\tilde{A}$ to determine an eigenvector matrix W and a diagonal matrix of eigenvalues D; and
using the eigenvectors W and eigenvalues D to generate indications of at least one of foreground information and background information in the first window;
generating and displaying an output video frame on a display device indicating at least one of the foreground information in the first window and the background information in the first window;
wherein the first window of video data is represented by a matrix X that includes video frames 1 to m.

2. The method of claim 1, wherein using the eigenvalues W and eigenvectors D to generate indications of at least one of foreground information and background information in the first window includes:
comparing the eigenvalues W to a eigenvalue threshold; and
for each eigenvector D corresponding to an eigenvalue W greater than the threshold, assigning the eigenvector to a set of eigenvectors associated with the foreground.

3. The method of claim 1, further comprising:
determining a second window within the video data, wherein the second window has a size that is half of a size of the first window; and
detecting foreground information and background information within each second window of the video data.

4. The method of claim 3, wherein a first eigenvalue threshold used to detect foreground information and background information in the first window is different from a second eigenvalue threshold used to detect foreground information and background information in the second window.

5. The method of claim 3, wherein an eigenvalue threshold used to detect foreground information and background information in the second window is based on the eigenvalues determined for the first window.

6. The method of claim 3, further comprising repeatedly determining smaller windows and detecting foreground information and background information within each smaller window within the video data until a minimum window size is processed.

7. A computer-implemented method of detecting motion in streaming video data, the method comprising:
receiving a stream of video data;
detecting motion within a first window of the stream of video data, the first window including a sequential set of video frames;
detecting motion within a subsequent window of the stream of video data, wherein the subsequent window overlaps at least a portion of the first window; and
displaying an output video feed on a display device indicating the detected motion;
wherein detecting motion within the sequent window includes reusing results of computations performed during the detection of motion within the first window,
wherein detecting motion within a first window of the stream of video data includes computing a singular value decomposition (SVD) of video data within the first window, wherein reusing results of computations performed during the detection of motion within the first window includes reusing redundant inner-products of the SVD of video data within the first window as part of a computation of an SVD of video data within the subsequent window.

8. A computing device for separating foreground information and background information in video data, the device comprising:
a central processing unit (CPU);
a main memory;
a graphics processing unit (GPU) having a graphics memory and a plurality of processing cores; and
a nontransitory computer-readable medium having computer-executable instructions stored thereon that, in response to execution by one or more processors of the computing device, cause the computing device to separate foreground information and background information in video data by:
collecting an initial matrix X of video data, wherein the matrix X is of rank n x m, wherein m is a number of frames of data in the video data, and wherein n is an amount of data from each video frame;
calculating a matrix $(X_1^{m-1})^T X_1^{m-1}$, wherein $X_1^{m-1}$ is a matrix representing the video data in frames 1 to m−1;
calculating eigenvalues S and eigenvectors V of matrix $(X_1^{m-1})$;
calculating a matrix $(X_1^{m-1})^T X_2^m$, wherein $X_2^m$ is a matrix representing the video data in frames 2 to m;
using S, V, and $(X_1^{m-1})^T X_2^m$ to calculate a matrix $\tilde{A}$;
calculating eigenvalues D and eigenvectors W of matrix $\tilde{A}$;

calculating eigenvalues D and W and presenting an output video frame on a display device indicating at least one of the foreground information and the background information in the first window.

9. The computing device of claim 8, wherein calculating the matrix $(X_1^{m-1})^T X_2^m$ includes:
   shifting all columns of the matrix $(X_1^{m-1})^T X_1^{m-1}$ one column to the left; and
   calculating the rightmost column of $(X_1^m)^T X_2^m$ based on the data of frame m.

10. The computing device of claim 8, wherein the instructions cause the computing device to use the GPU to calculate the matrices $(X_1^{m-1})^T X_1^{m-1}$, $(X_1^{m-1})^T X_2^m$, and Ã; and wherein the instructions cause the computing device to use the CPU to calculate the eigenvalues S and D, and to calculate the eigenvectors V and W.

11. The computing device of claim 10, wherein the CPU calculates the eigenvalues S and eigenvectors V at least partially concurrently with the calculation by the GPU of the matrix $(X_1^{m-1})^T X_2^m$.

12. The computing device of claim 8, wherein the instructions cause the computing device to use the GPU to use D and W to generate indications of at least one of foreground information and background information in the video data; wherein the indication of foreground information is a matrix S; and wherein the indication of background information is a matrix L.

13. The computing device of claim 12, wherein the instructions cause the computing device to use the GPU to output a video feed to a display device using at least one of matrix S or matrix L without copying the matrix S or the matrix L to the main memory.

14. The computing device of claim 8, wherein using S, V, and $(X_1^{m-1})^T X_2^m$ to calculate a matrix Ã includes:
   generating Σ, which is an element-wise square root of S; and
   multiplying $Σ^{-1}$ times V times $(X_1^{m-1})^T X_2^m$ to generate a matrix $U^T X_2^m$.

15. The computing device of claim 14, wherein using S, V, and $(X_1^{m-1})^T X_2^m$ to calculate a matrix Ã further includes:
   multiplying S, V, and $U^T X_2^m$.

16. The computing device of claim 8, wherein the instructions further cause the computing device to analyze a subsequent frame of video data after the initial matrix A, by:
   shifting all of the rows of $(X_1^{m-1})^T X_2^m$ up one row to generate a partial result of $(X_2^m)^T X_2^m$; and
   calculating the bottom row of $(X_2^m)^T X_2^m$ based on data within the subsequent frame of video data.

17. The computing device of claim 16, wherein the instructions further cause the computing device to:
   transfer a result of processing on the GPU to the main memory at least partially concurrently with processing of a subsequent frame by the GPU.

18. The computing device of claim 17, wherein the instructions further cause the computing device to:
   transfer a result of processing of the subsequent frame by the GPU to the main memory, wherein the result includes a one-dimensional matrix.

* * * * *

UNITED STATES PATENT AND TRADEMARK OFFICE
CERTIFICATE OF CORRECTION

PATENT NO. : 9,674,406 B2
APPLICATION NO. : 14/828396
DATED : June 6, 2017
INVENTOR(S) : J. N. Kutz et al.

It is certified that error appears in the above-identified patent and that said Letters Patent is hereby corrected as shown below:

| Column | Lines | Error |
|---|---|---|
| 20 | 61-62 | "matrix $(X_1^{m-1};$" should read |
| (Claim 8, | Lines 21-22) | --matrix $(X_1^{m-1})^T X_1^{m-1};$-- |

Signed and Sealed this
Thirtieth Day of January, 2018

Joseph Matal
*Performing the Functions and Duties of the
Under Secretary of Commerce for Intellectual Property and
Director of the United States Patent and Trademark Office*